United States Patent
Kraft et al.

[19]

[11] Patent Number: 6,112,225
[45] Date of Patent: Aug. 29, 2000

[54] TASK DISTRIBUTION PROCESSING SYSTEM AND THE METHOD FOR SUBSCRIBING COMPUTERS TO PERFORM COMPUTING TASKS DURING IDLE TIME

[75] Inventors: Reiner Kraft, Gilroy; Qi Lu, San Jose; Marat Wisebond, San Francisco, all of Calif.

[73] Assignee: International Business Machines Corporation, Armonk, N.Y.

[21] Appl. No.: 09/050,608

[22] Filed: Mar. 30, 1998

[51] Int. Cl.[7] .......................... G06F 15/16; G06F 15/173
[52] U.S. Cl. .................. 709/202; 709/201; 709/202; 709/205; 709/217; 709/224; 709/227; 364/200; 364/281.3; 364/468; 712/28
[58] Field of Search ..................... 709/100, 201, 709/219, 227, 304, 102, 205, 217, 224, 202; 713/323; 712/28; 364/200, 281, 3, 468

[56] References Cited

U.S. PATENT DOCUMENTS

| | | | |
|---|---|---|---|
| 5,031,089 | 7/1991 | Liu et al. | 364/200 |
| 5,377,350 | 12/1994 | Skinner | 395/600 |
| 5,594,915 | 1/1997 | Atalla | 395/800 |
| 5,740,549 | 4/1998 | Reilly et al. | 705/14 |
| 5,796,945 | 8/1998 | Tarabella | 395/200.9 |

OTHER PUBLICATIONS

Allan Bricker et al., "Condor Technical Summary", Jan. 28, 1992.

*Primary Examiner*—Le Hien Luu
*Assistant Examiner*—Beatriz Prieto
*Attorney, Agent, or Firm*—Dan Hubert & Assoc.

[57] ABSTRACT

A computer executable "aggregate" task is processed by dividing it into subtasks and distributing the subtasks "on demand" to remotely located subscribing computers via a computer network. The aggregate task originates at a coordinating computer, coupled to one or more peripheral computers by appropriate communications links. The coordinating computer divides the aggregate task into multiple independent subtasks. Each peripheral computer begins to "subscribe" to the coordinating computer's aggregate task by obtaining an "idle time activation program" from the coordinating computer, and then installing the program locally. The idle time activation program which may include a screen saver, activates automatically when the subscribing computer is inactive. Continuing the subscription process, each peripheral computer requests a subtask from the coordinating computer. In response, the coordinating computer distributes different subtasks among the subscribing computers, completing the subscription process. The subscribing computers automatically work on their respective subtasks whenever they are idle, as directed by the local idle time activation program. When a subscribing computer completes its subtask, it transmits results back to the coordinating computer. When results of all subtasks have been received from subscribing computers, the coordinating computer compiles and stores these results, concluding the aggregate task.

42 Claims, 5 Drawing Sheets

TASK DISTRIBUTION PROCESSING SYSTEM AND THE METHOD FOR SUBSCRIBING COMPUTERS TO PERFORM COMPUTING TASKS DURING IDLE TIME

BACKGROUND OF THE INVENTION

1. Field of the Invention

The present invention relates to distributed processing systems. More particularly, the invention concerns a system for processing a computer executable task by dividing it into subtasks and distributing the subtasks "on demand" to remotely located "subscribing" computers via the public Internet, a corporate Internet, or another computer network. Application programs running on the subscribing computers obtain subtasks from a coordinating computer "on demand," manage execution of the obtained subtasks during idle processing time of the subscribing computer, and submit processing results back to the coordinating computer.

2. Description of the Related Art

Along with the exploding computing capacity of today's computers, people are developing computing projects of similarly exploding complexity. Typical personal computers handily satisfy most business needs, such as word processing, database management, internet access, e-mail, and the like. Buoyed by the prospect of computer models, however, mathematicians, engineers, and other scientists are designing incredibly massive computing projects beyond the scope of personal computers. To suit these needs, manufacturers are developing computing platforms of increasing power. Computer "workstations," for example, provide significantly more computing power than personal computers. Even more powerful than workstations are mainframe computers, many of which are manufactured by INTERNATIONAL BUSINESS MACHINES CORP. ("IBM"). Even more powerful than mainframe computers are supercomputers, such as CRAY computers manufactured by Silicon Graphics Corporation. Many applications involving complex or massive computing tasks simply cannot be performed with anything less than a supercomputer. Some projects suitable for mainframes or supercomputers include weather simulation, aircraft modeling and testing, sophisticated graphics rendering, DNA matching, financial analysis, distributed internet crawling, etc.

For many users, however, the purchase or lease of a supercomputer or mainframe computer is difficult and/or financially impractical. Mainframe computers can cost hundreds of thousands, or even millions of dollars. And, supercomputer time is competitively awarded to applicants based upon detailed research proposals, still requiring a substantial cost to the user. Nonetheless, the work of many people still integrally involves complicated computing tasks that demand the higher computing power of a mainframe or supercomputer.

In stark contrast to this pronounced need for computing power, many businesses own tens of thousands of computers that remain idle for a significant portion of time during off-hours, weekends, and holidays. Idle computers can certainly also be found in government offices and individual homes, as well. Therefore, a tremendous amount of computing resources, such as CPU cycles and communication bandwidth, is being wasted on a daily basis.

Although known computing systems such as those mentioned above may serve their intended purposes well, there exists a great imbalance between the unsatisfied computing tasks on one hand, and the idle computing resources on the other. Consequently, known systems are not completely adequate from the standpoint of efficiency.

SUMMARY OF THE INVENTION

Broadly, the present invention concerns a system for processing a computer executable "aggregate" task by dividing it into subtasks and distributing the subtasks "on demand" to remotely located subscribing computers via a computer network such as the public Internet. Application programs running on the subscribing computers obtain subtasks from a coordinating computer "on demand", and manage execution of the obtained subtasks during their idle processing time. Ultimately, the subscribing computers submit the results of their processing back to the coordinating computer.

The aggregate task originates at the coordinating computer, which is coupled to one or more peripheral computers by appropriate communications links such as telephone lines, wireless links, or another suitable connection. The coordinating computer divides the aggregate task into multiple independent subtasks. Assignment of subtasks to the peripheral computers facilities begins when the peripheral computers "subscribe" to the coordinating computer. Each peripheral computer subscribes by obtaining a common idle time activation program from the coordinating computer, and then installing the program locally. Each subscribing computer automatically activates its idle time activation program whenever the subscribing computer is inactive. Accordingly, the idle time activation program may comprise a screen saver program, for example. Such a screen saver, implementing the features of the invention, is called an "active screen saver". As another part of subscription, the subscribing computer requests a subtask from the coordinating computer. In response to this request and others like it, the coordinating computer distributes different subtasks among the subscribing computers.

After receiving their respective subtasks, the subscribing computers automatically work toward subtask completion whenever they are idle. Idle time is automatically detected by the idle time activation program running locally on each subscribing computer. When a subscribing computer completes its subtask, it transmits its subtask results back to the coordinating computer. When results of all subtasks have been received from subscribing computers, the coordinating computer compiles and stores these results, concluding the aggregate task.

In one embodiment, the invention may be implemented to provide a method to allocate and coordinate completion of a subdivisible processing task among subscribing computers during idle processing time. In another embodiment, the invention may be implemented to provide an apparatus, such as a computer-driven system to coordinate completion of a subdivisible processing task among subscribing computers facilities during idle processing time. In still another embodiment, the invention may be implemented to provide a signal-bearing medium tangibly embodying a program of machine-readable instructions executable by a digital data processing apparatus to perform a method to coordinate completion of a subdivisible processing task among subscribing computers during idle processing time.

The invention affords its users with a number of distinct advantages, brought about by a clever integration of executing imported tasks within programs (such as "screen savers") that are designed to activate when computers are idle. First, the invention requires little administration and management effort by the owners of the computer on which the idle time activation program is running. The operator need only download, install, and activate the invention's idle time activation program, which may be a screen saver program. Owing in part to the natural characteristics of a screen saver, the starting, pausing, resuming, and ending of an imported task may be performed outside the operator's view.

Second, unlike some previous systems, active screen savers can offer a platform-independent way of utilizing idle computers. This is possible by employing platform-independent approaches of representing tasks, such as the JAVA byte code.

Third, the invention offers a general model of conducting large scale distributed computing that is easy to implement and administer, and economically viable. This is possible because of the minimal burden on the participants, and the possibility of the participants obtaining rewards from the coordinating computer based on their contribution toward completion of the aggregate task. There is no cost to participants because their machines are going to be idle anyway, if not used to run the active screen saver.

Fourth, the invention can reduce the costs of corporate computing. Billions of dollars are currently being wasted by business-owned computers sitting idle. By effectively putting idle computers to work with this invention, an enormous, sustained economic benefit is possible. The invention also provides a number of other advantages and benefits, which should be apparent from the following description of the invention.

DETAILED DESCRIPTION

The nature, objectives, and advantages of the invention will become more apparent to those skilled in the art after considering the following detailed description in connection with the accompanying drawings. As mentioned above, the invention concerns a system for processing a computer executable task by dividing it into subtasks and distributing the subtasks "on demand" to remotely located subscribing computers via a computer network such as the public Internet. Application programs running on the subscribing computers obtain subtasks from a coordinating computer "on demand", manage execution of the obtained subtasks during idle processing time of the subscribing computer, and submit processing results back to the coordinating computer.

HARDWARE COMPONENTS & INTERCONNECTIONS

Distributed Processing System

Figure 1:
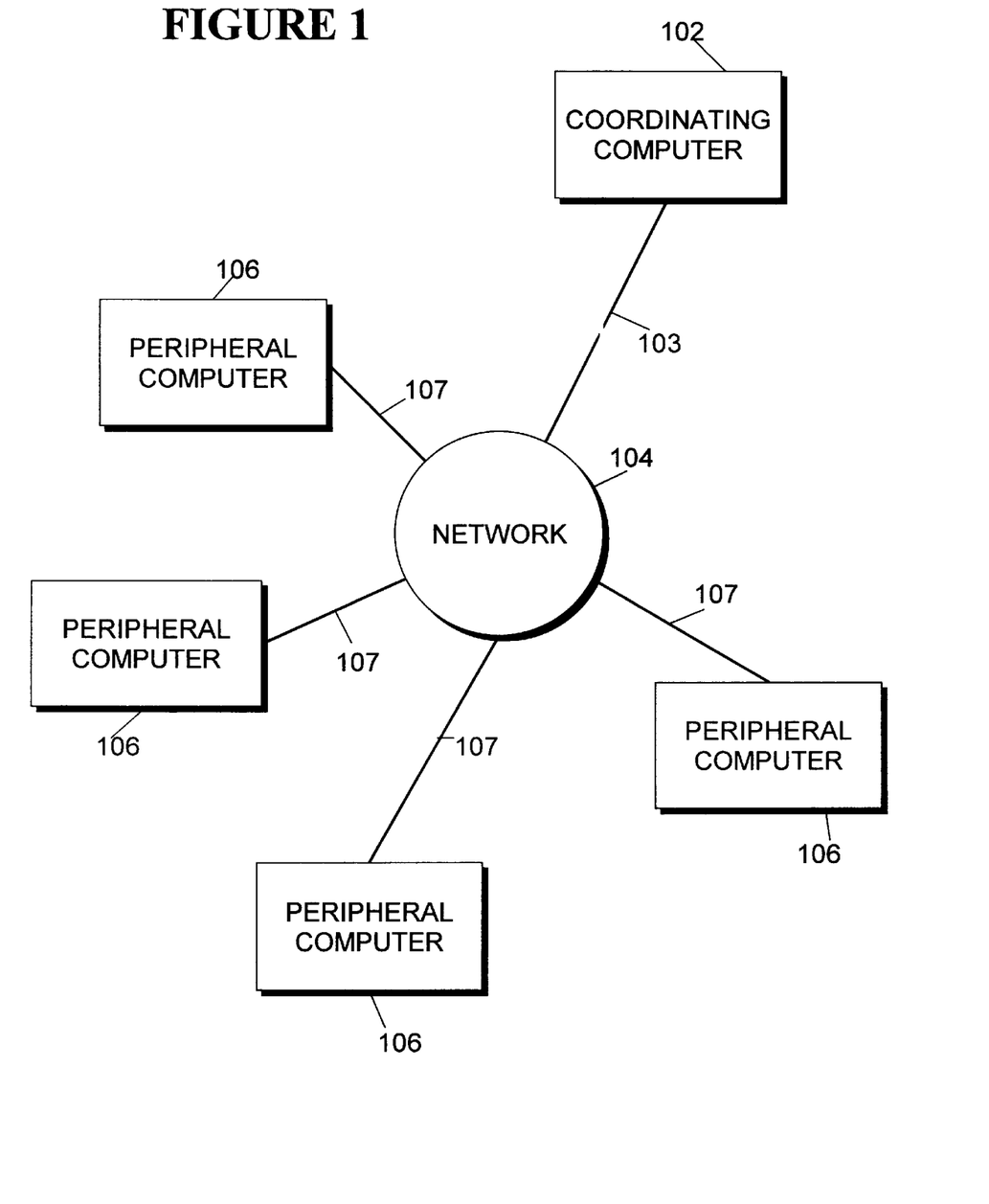
FIG. 1 is a block diagram of the hardware components and interconnections of a distributed processing system in accordance with the invention.

One aspect of the invention concerns a distributed processing system, which may be embodied by various hardware components and interconnections, as illustrated by the system 100 of FIG. 1. This system 100 includes a coordinating computer 102 connected to multiple peripheral computers 106 by a network 104. The coordinating computer 102 obtains an aggregate task, divides it into independent subtasks, and allocates the subtasks among the peripheral computers 106 via the network 104. The network 104 may comprise the public Internet, a corporate or government Intranet, a local area network ("LAN"), wide area network, a common server machine, telephone modem, cable television line, wireless link, or any other suitable telecommunications means for each peripheral computer 106 to exchange messages with the coordinating computer 102.

The coordinating computer 102 may comprise any digital processing apparatus of suitable processing power to perform the functions explained below. Use of the term "computer" is not meant to be limiting, as the computer 102 may be embodied by many different models of processing device, such as one or more microprocessors, personal computers, workstations, mainframes, supercomputers, or a subpart or combination thereof. As a particular example, the computer 102 may comprise a PS/2 model computer by INTERNATIONAL BUSINESS MACHINES CORP. ("IBM").

The peripheral computers 106, like the coordinating computer 102, may be embodied by digital data processing apparatuses of many different makes and models. In one implementation of the invention, where the network 104 is embodied by the public Internet, there may be an extremely diverse assortment of peripheral computers 106, owned by an eclectic array of computer users across the world. The computers 106 are called "peripheral" because they include separate processors from the coordinating computer 102, and may frequently be located remotely therefrom.

The coordinating computer 102 and network 104 are coupled by a link 103 which comprises a device appropriate to the hardware and software of the coordinating computer 102 and the network 104. Examples include a telephone line, cable television line, fiber optic connection, wireless link, hard-wired connection, etc. Similarly, each link 107 between peripheral computers 106 and the network 104 comprises a device selected according to the hardware of the network 104 and the respective peripheral computer 106.

Figure 2:
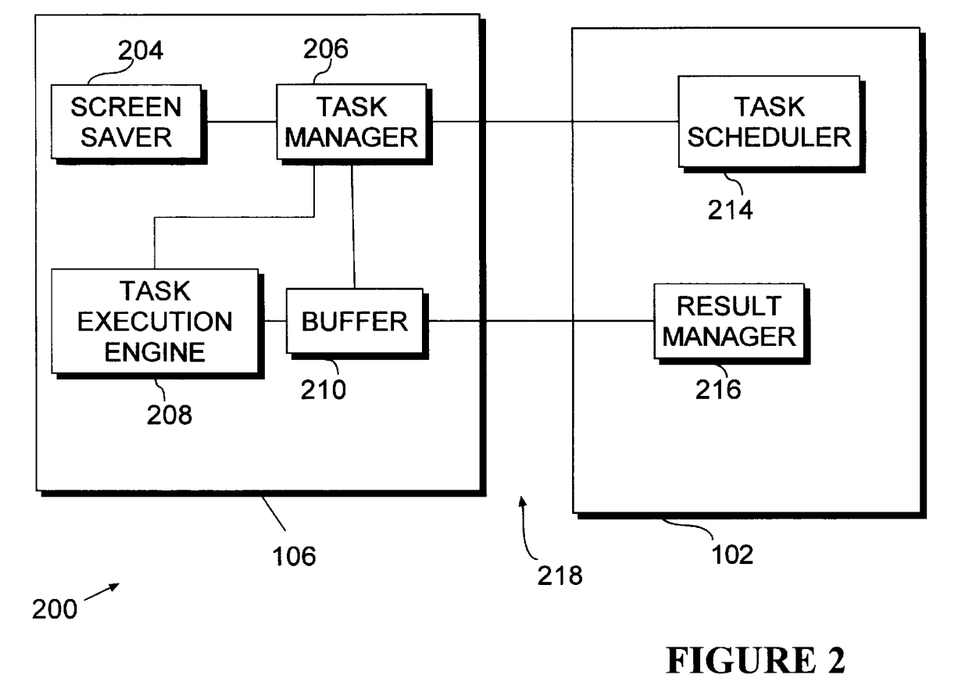
FIG. 2 is a block diagram showing a coordinating computer, peripheral computer pair in greater detail, in accordance with the invention.

FIG. 2 illustrates the coordinating computer 102 and an exemplary peripheral computer 106 in greater detail. The coordinating computer 102 includes a task scheduler 214 and a result manager 216. The peripheral computer 106 includes a screen saver 204, a task manager 206, a task execution engine 208, and a buffer 210. The computers 102, 106 are interconnected by the network 104, which is illustrated by the communication paths 218. Depending upon the particular requirements of the application, the components of the computers 102, 106 may be provided by hardware devices, software modules, or a combination. With the benefit of the present disclosure, implementation of these components will be apparent to those of ordinary skill in the art.

In the coordinating computer 102, the task scheduler 214 performs the following functions, described in greater detail below. The task scheduler 214 divides the aggregate task into independent subparts, receives subscriptions from the peripheral computers 106, and allocates subtasks among the peripheral computers 106. The result manager 216 receives the results of completed subtasks from the peripheral computers 106, and compiles and further processes these results.

In the peripheral computer 106, the task manager 206 performs a one-time request for the subtask from the coordinating computer 102, performs a one-time installation of the screen saver 204 program, directs execution of the subtask, and manages transmittal of the completed subtask back to the coordinating computer 102. The task manager 206 maintains all necessary information to ensure that the subtask is correctly performed to fruition. The task manager 206 may also maintain statistics regarding the historical application consumption of the peripheral computer's resources toward subtask computation.

The screen saver 204 activates whenever the peripheral computer 106 is "idle", as discussed below. As an example, the screen saver 204 may be invoked when the computer has detected inactivity from its users for a specified period of time, such as fifteen minutes. The screen saver 204 may simply provide a signal representative of the computer's idle state, or it may perform added tasks such as invoking an energy saving mode of an associated computer monitor, such as blanking the screen, removing power from the monitor, display various images on the monitor that are unlikely to damage the monitor despite prolonged use, etc. Furthermore, the screen saver 204 may prompt users for passwords and verify the passwords when the screen is locked, etc. Importantly, the screen saver 204 provides a distinct signal to the task manager 206 representing the idle condition.

The foregoing screen saver is merely depicted as a likely and universally available application that becomes active when the computer 106 is idle. As an alternative, the screen saver 204 may be implemented instead with another program that detects idle processing time and performs an action, unrelated to screen saving or merely provides the task manager 206 with a signal representative of the idle condition.

The task execution engine 208 does the actual work of subtask computation, under direction of the task manager 206. As an example, the engine 208 may be provided by a JAVA virtual machine, or an ActiveX control engine. The engine 208 interprets the imported subtask, and issues necessary commands and system calls to execute the subtask.

Each time the computer 106 leaves its idle state, intermediate results of the subtask are temporarily stored in the buffer 210. The buffer 210 may be provided by software, or by a hardware storage component such as RAM, a magnetic disk drive, etc.

Exemplary Digital Data Processing Apparatus

As mentioned above, the computers 102, 106 may be implemented by a variety of different digital processing machines. Accordingly, another aspect of the invention concerns a digital data processing apparatus, programmed to perform the duties of coordinating computer 102 or peripheral computer 106.

Figure 3:
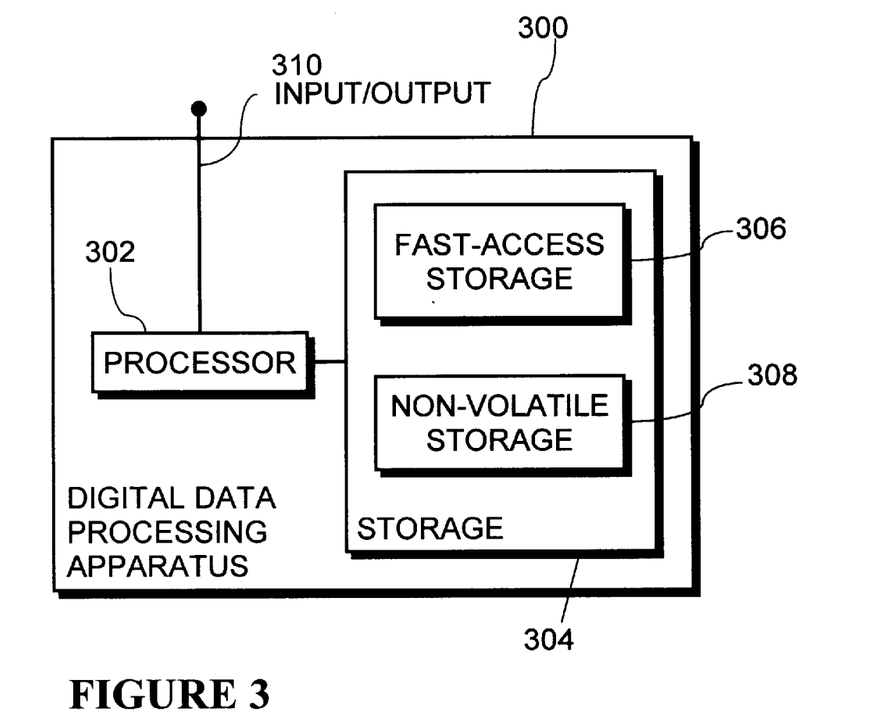
FIG. 3 is a block diagram of a digital data processing machine in accordance with the invention.

FIG. 3 shows an example of one digital data processing apparatus 300. The apparatus 300 includes a processor 302, such as a microprocessor or other processing machine, coupled to a storage 304. In the present example, the storage 304 includes a fast-access storage 306, as well as nonvolatile storage 308. The fast-access storage 306 may comprise random access memory, and may be used to store the programming instructions executed by the processor 302. The nonvolatile storage 308 may comprise, for example, one or more magnetic data storage disks such as a "hard drive", a tape drive, or any other suitable storage device. The apparatus 300 also includes an input/output 310, such as a line, bus, cable, electromagnetic link, or other means for exchanging data with the processor 302.

Despite the specific foregoing description, ordinarily skilled artisans (having the benefit of this disclosure) will recognize that the apparatus discussed above may be implemented in a machine of different construction, without departing from the scope of the invention. As a specific example, one of the components 306, 308 may be eliminated; furthermore, the storage 304 may be provided on-board the processor 302, or even provided externally to the apparatus 300.

OPERATION

In addition to the various hardware embodiments described above, a different aspect of the invention concerns various computer-implemented methods, such as an overall method for processing a computer executable task by dividing it into subtasks and distributing the subtasks "on demand" to remotely located subscribing computers via a computer network such as the public Internet. Separate aspects of the invention include sub-components of this process specific to the participant coordinating and peripheral computers.

Signal-Bearing Media

In the context of FIGS. 1–2, such a method may be implemented, for example, by operating the coordinating computer 102 and/or peripheral computer 106, as embodied by digital data processing apparatuses 300, to execute separate sequences of machine-readable instructions. Each respective sequence of instructions may reside in various types of signal-bearing media. In this respect, one aspect of the present invention concerns a programmed product, comprising signal-bearing media tangibly embodying a program of machine-readable instructions executable by a digital data processor to perform the duties of the coordinating computer or peripheral computer of the invention.

Figure 4:
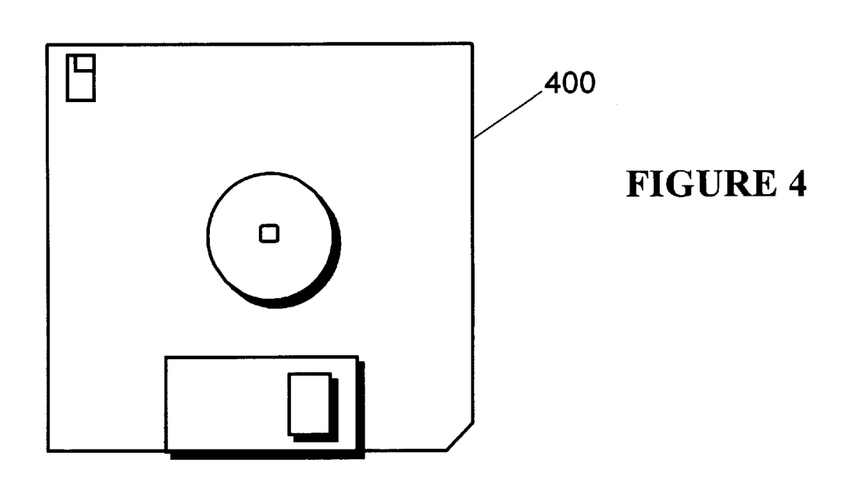
FIG. 4 shows an exemplary signal-bearing medium in accordance with the invention.

This signal-bearing media may comprise, for example, RAM (not shown) embodied by the fast access storage 306. Alternatively, the instructions may be contained in another signal-bearing media, such as a magnetic data storage diskette 400 (FIG. 4), directly or indirectly accessible by the processing unit 302. Whether collocated with the processing apparatus 300 or situated elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape), paper "punch" cards, or other suitable signal-bearing media including transmission media such as digital and analog and communication links and wireless. In an illustrative embodiment of the invention, the machine-readable instructions executed by the coordinating computer 102, task manager 206, and/or screen saver 204 may comprise software object code, compiled from a language such as Visual Basic, C++, etc. Instructions executed by the task execution engine 208 may be software object code from a platform-independent language, such as JAVA, ActiveX, etc.

Coordinating Computer Operation

Figure 5:
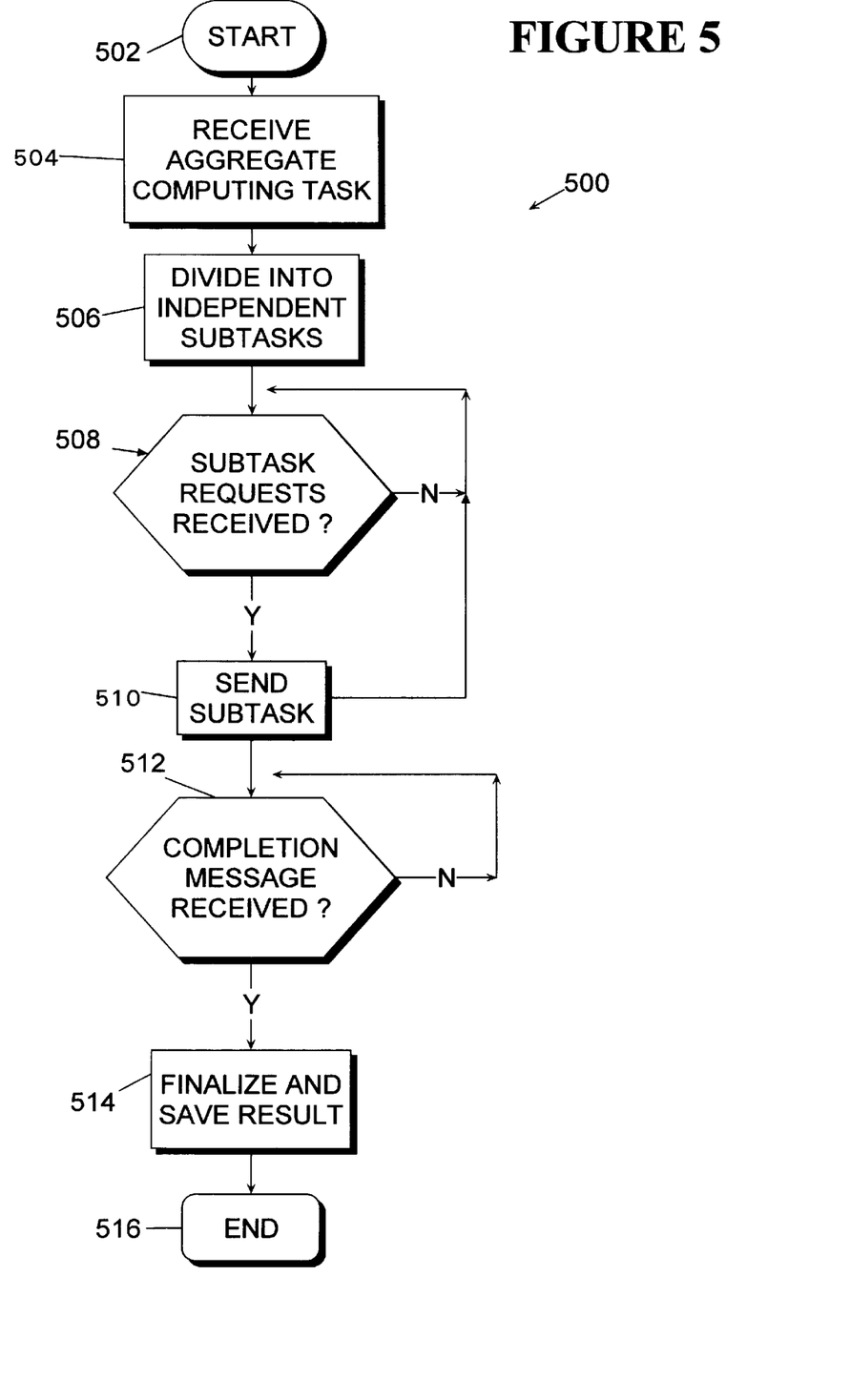
FIG. 5 is a flowchart of an operational sequence for task management by a coordinating computer, in accordance with the invention.

FIG. 5 shows a sequence 500 to illustrate one example of the steps performed by the coordinating computer 102, as part of the overall distributed processing approach of the invention. For ease of explanation, but without any intended limitation, the example of FIG. 5 is described in the context of FIGS. 1–2 described above. The steps 500 begin in step 502. In step 504, the coordinating computer 102 receives the aggregate computing task. This may occur in various ways. For example, an operator may generate the task using the computer 102, manually copy the task into storage of the computer 102, download the task onto the computer 102 from a remote site, etc. In accordance with the invention, the aggregate task may be decomposed into multiple, non-sequential, smaller tasks, such that solving these separately and simultaneously solves the aggregate task.

Next, in step 506 the task scheduler 214 divides the received aggregate task into subtasks. Additionally in step 506, the task scheduler 214 uses a specific mechanism to represent the subtasks so that when a subtask is later transmitted to a peripheral computer, the task execution engine 208 can interpret the subtask and issue the necessary computing commands and system calls to accomplish the imported subtask. There are many possible alternatives for such a subtask representation. One example is the use of compiled binary code to represent subtasks, and use of the task execution engine 208 to run this code. Another example, subtask representation may employ an interpreted or scripted language such as JAVA or PERL, where the task execution engine 208 uses a JAVA virtual machine or PERL engine to interpret the computation of the imported subtask represented in JAVA bytecode or PERL script. Ordinarily skilled artisans will recognize still other approaches for representing a subtask in a manner suitable for sending to the task execution engine 208, interpretation by the engine 208, and execution thereby.

After step 506, the coordinating computer 102 is ready to allocate the aggregate task among subscribing peripheral computers 106. In step 508, the task scheduler 214 determines whether any subtask requests have been received from the peripheral computers 106. The task scheduler 214 continues to wait until the first subtask request is received. When this occurs, the task scheduler 214 sends a subtask to the requesting peripheral computer in step 510. Since the subtasks are independent, any subtask may be sent without regard to any particular order. In the illustrated embodiment, the task scheduler 214 considers the particular hardware configuration and operating system of the peripheral computer 106 in choosing and sending the subtask of step 510.

Each time step 510 is performed, two actions follow. In one action, step 508 is repeated to check again for new subtask requests from the peripheral computers 106. If all subtasks have been distributed, but further subtask requests have been received, the task scheduler 214 may distribute subtasks of another, unrelated aggregate task next time step 510 is performed. In the other action following step 510, the result manager 216 in step 512 determines whether completion messages have been received from all peripheral computers 106 cooperatively performing the aggregate task. If not, step 512 continues to monitor the completion status. When completion messages have been received from all subscribing peripheral computers, the aggregate task has been solved. In this event, the result manager 216 finalizes the computation results and saves them in step 514. The finalization of step 514 may involve obtaining the results from the peripheral computer, if their completion messages did not include the results. Additionally, step 514 may involve other modification to the computation results, such as assembling, compiling, or other reformatting. In one embodiment, the result manager 216 may perform further computations or analysis based on the subtask results to provide a comprehensive output requiring each of the subtask results as input. One such example is the calculations of prime factors or a large number. The results are saved in step 514. After step 514, the routine 500 ends in step 516. If other aggregate tasks have been distributed concurrently, step 516 ends the routine 500 for the completing aggregate task only; steps 508–512 continue to run, monitoring the completion of the subtasks of the remaining aggregate tasks.

Peripheral Computer Operation

Subscribing and Executing Subtask

Figure 6:
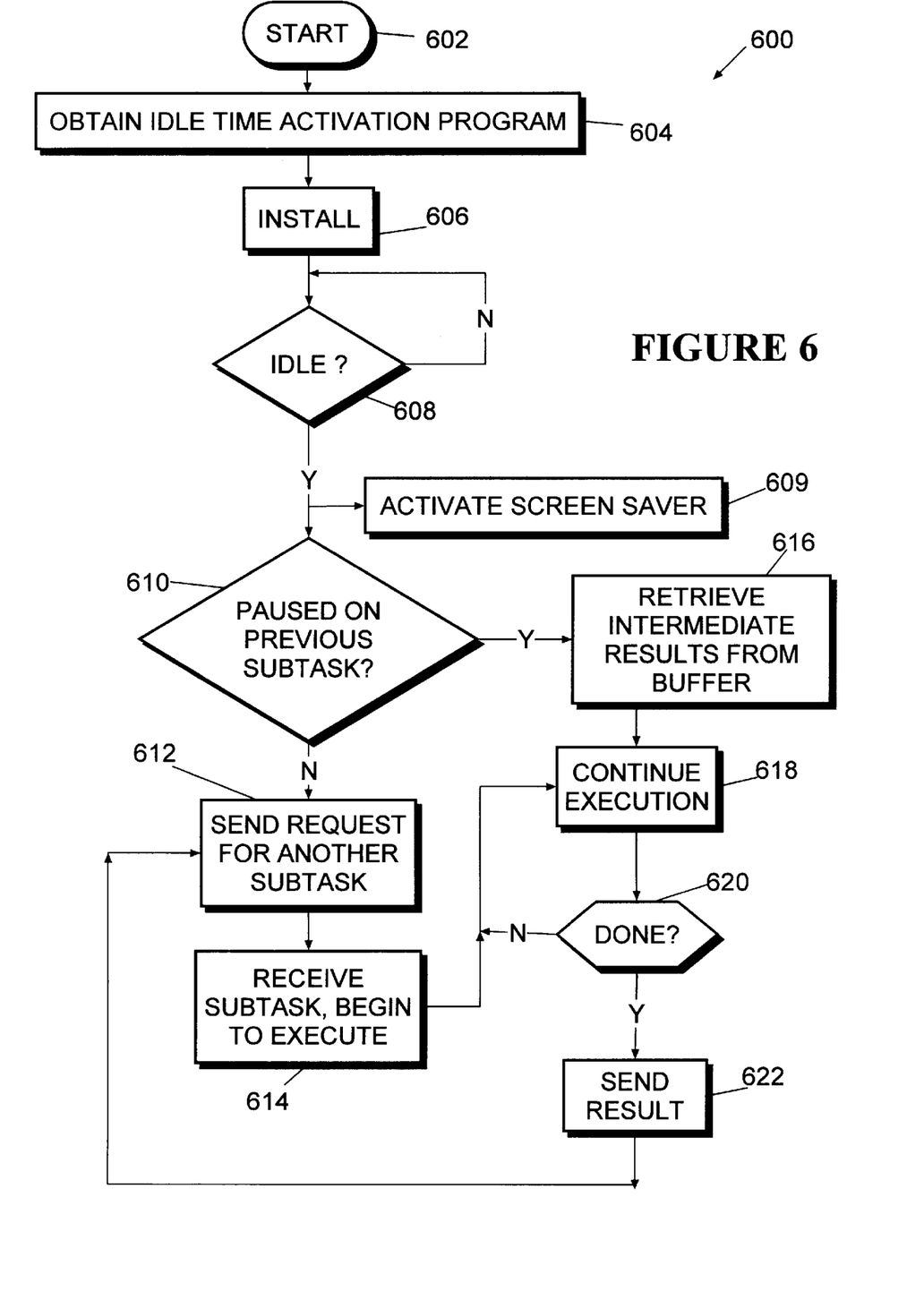
FIG. 6 is a flowchart of an operational sequence for subtask performance by a subscribing computer, in accordance with the invention.

Supplementing the description of FIG. 5, FIG. 6 illustrates a sequence 600 performed by an exemplary peripheral computer 106 as part of the overall distributed processing approach of the invention. The peripheral computer's role involves subscribing to the coordinating computer, and executing its assigned subtask. For ease of explanation, but without any intended limitation, the example of FIG. 6 is described in the context of FIGS. 1–2 and 5, as described above. The steps 600 begin in step 602.

In step 604, the peripheral computer 106 obtains an idle time activation program. This program includes components that implement the task manager 206, task execution engine 208, and buffer 210. The idle time activation program may also include the screen saver 204, or the task execution engine 208 may be configured to operate with the user's existing screen saver. In the illustrated example, all idle time activation programs distributed to the peripheral computers 106 are substantially alike, aside from differences due to machine platform, operating system, etc.

Step 604 may obtain the idle time activation program in a number of different ways. For instance, step 604 may be achieved by loading a diskette or CD-ROM to the peripheral computer 106, and installing the idle time activation program therefrom. As a different example, step 604 may involve the peripheral computer 106 downloading the idle time activation program from the coordinating computer 102 via the network 104. In either example, it is important to obtain a version of the idle time activation program that is compatible with the particular hardware components and operating system of the peripheral computer 106.

After step 604, the peripheral computer 106 installs the idle time activation program in step 606. As an example, installation of the program may involve copying the program to a nonvolatile memory, such as a magnetic disk drive, and linking the program to the peripheral computer's operating system for activation at the appropriate times. After this step, the task manager 206, task execution engine 208, buffer 208, and screen saver 204 components are all operational. Accordingly, step 606 then proceeds to step 608, where the screen saver 204 determines whether the peripheral computer 106 is "idle". The invention accommodates many different variations of the term "idle". As one example, the peripheral computer 106 may be deemed "idle" when user input, such as keyboard and mouse input, is not received for a prescribed time, such as fifteen or thirty minutes. As another option, a peripheral computer may be deemed "idle" when the percent loading of its processor falls below a prescribed level; this parameter (e.g., percent loading) may be available by executing an appropriate system call, such as "get rusage" in UNIX. In still another embodiment, input/output ("I/O") activity of the peripheral computer may be considered in determining idleness. As another example, the computer may be deemed "idle" in accordance with the specific conditions that activate a particular commercially available screen saver, such as the MICROSOFT WINDOWS 95 screen saver. The idle condition may be judged in view of one, several, or all of the foregoing factors. As an example, the peripheral computer 106 may be deemed idle when no keyboard or mouse entry has occurred in the past ten minutes, the correct processor loading is less than five percent, and the I/O utilization is less than twenty percent.

When step 608 finds that the host peripheral computer 106 is idle, the screen saver 204 initiates its screen saver in step 609 to prevent damage to the peripheral computer's monitor; this is only an option, however, and the screen saver function may be omitted entirely. More important, the screen saver 204 in step 609 also sends a message to the task manager 206 indicating that the peripheral computer 106 is idle. In response, the task manger 206 in step 610 determines whether the task execution engine 208 is already engaged in computation of an uncompleted subtask. If so, the task manager 206 retrieves the intermediate results from the buffer 210 (step 616), and directs the task execution engine 208 to continue executing the subtask (step 618). In another embodiment, steps 610 and 616 may be omitted; in this case, uncompleted subtasks interrupted by the user's applications or other activity are aborted and restarted when the next idle period begins.

Alternatively, if step 610 finds no subtask already in progress, the task manager 206 in step 612 requests a subtask. This involves submitting a subtask request to the coordinating computer 102. To benefit the coordinating computer 102, the subtask request may be accompanied by a machine-readable description of the peripheral computer's hardware components, operating system, and the like. Upon receipt of the subtask (step 614), the peripheral computer 106 has "subscribed" to the coordinating computer's aggregate task. At this point, the task execution engine 208 may start computing the subtask in step 618.

The task execution engine 208 continues to work on the assigned subtask in steps 620 and 618, until finished. When the task manager 206 determines that the task execution engine 208 is finished computing the subtask, the task manager 206 sends the computation result to the coordinating computer (step 622), and returns to step 612 to obtain a new subtask.

Interrupt Handling

Figure 7:
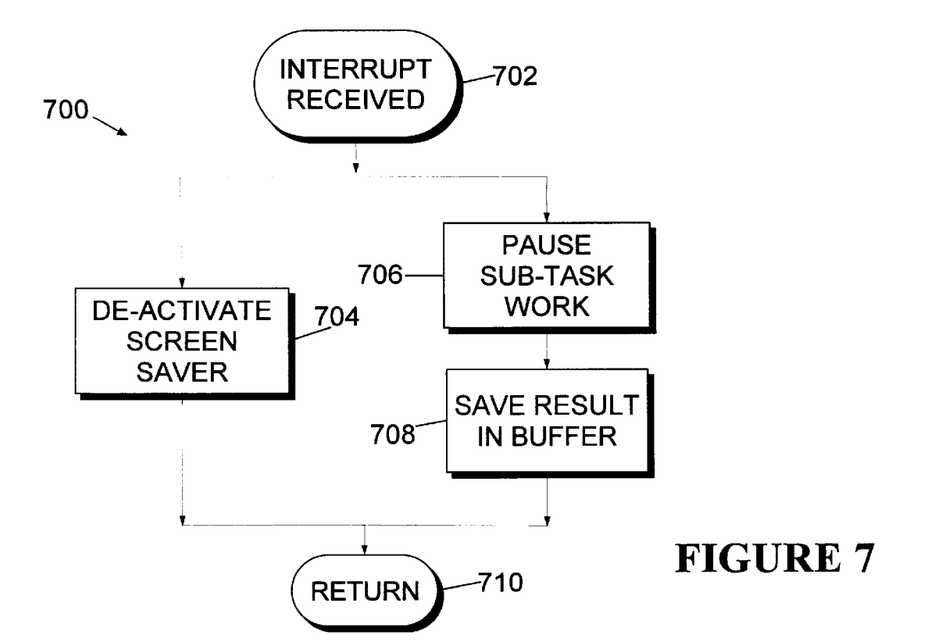
FIG. 7 is a flowchart of an operational sequence for interrupt processing by a subscribing computer, in accordance with the invention.

As mentioned above, subtask computation occurs in the peripheral computers 106 during "idle" processing times. When the peripheral computer 106 is active (i.e., not "idle"), work toward completing the subtask is suppressed. During these times, the peripheral computer 106 performs normal tasks as configured by its operator. FIG. 7 illustrates one example of this process in some detail as shown by the steps 700. In this example, when the peripheral computer 106 becomes active, it generates a hardware interrupt, as shown by step 702. In response, the screen saver 204 deactivates its screen saver function. Accordingly, the peripheral computer's monitor is powered up (if power has been removed), and permitted to display the image being output by the peripheral computer's processor. As another consequence of the interrupt of step 702, the task execution engine 208 pauses its subtask computation in step 706. The task execution engine 208 saves its intermediate computations in the buffer 210. After steps 704–708 complete, the interrupt routine 700 ends in step 710.

In another embodiment, one or both of the screen saving function and the subtask pause function may be omitted. In this case, the interrupt 702 causes the routine 600 to revert to step 608, followed by restarting of the interrupted subtask at the next idle time.

Reward System

To make subtask subscription desirable to peripheral computer owners, a reward system is contemplated. This system provides awards to subscribing peripheral computer users in accordance with their contribution toward aggregate task performance. For example, rewards such as money, free t-shirts, and the like may be awarded to peripheral computer users according to their accrued computing time devoted to subtasks, size or number of subtasks completed, etc. As mentioned above, such statistics may be monitored by the each peripheral computer's task execution engine 208.

Security

Optionally, the invention may incorporate a number of security measures to allay peripheral computer owners' security concerns by limiting peripheral computer exposure to damage from downloading and using the idle time activation program. Users may also be concerned with excessive allocation of computing resources to subtask completion. As one option, the idle time activation program may include a software-implemented "sandbox," limiting its resource use to disk space under a particular directory, a specific amount of network bandwidth of computing cycles, etc. Execution of the imported subtasks is limited to the sandbox. This assures that, even if there is a problem, an imported task can cause limited damage. In one embodiment, the software-implemented sandbox may be implemented using similar technology as JAVA Applets, which are well known in the software art.

Another option is to require digital signatures for imported tasks. In this way, the peripheral computers can verify that received programs and subtasks originate from a trusted source. Still further security measures may be provided by requiring authentication for communications between peripheral and coordinating computers.

Furthermore, to ensure that subtask execution does not supersede any "daemons" or other background services running during peripheral computer idle time, it may be desirable to establish a sufficiently low priority for subtask computation activities.

OTHER EMBODIMENTS

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

What is claimed is:

1. A method performing a computing task comprising operations of:

a coordinating computer receiving an aggregate computing task divisible into multiple independent subtasks;

announcing an opportunity for other computers to participate in the aggregate computing task, and in response, one or more subscribing computers submitting requests to participate in the aggregate computing task, the subscribing computers including one or more computers having principal functions distinct from the aggregate computing task;

the coordinating computer receiving the requests from subscribing computers, and in response, the coordinating computer assigning the subtasks by distributing the subtasks among the subscribing computers, and also sending an idle time activation program to each subscribing computer;

each subscribing computer installing the idle time activation program, whereupon the idle time activation program causes the subscribing computer to perform operations including working toward completion of the assigned subtask when the subscribing computer is in a predefined idle state with respect to the subscribing computer's principal functions, and halting work toward completion of the assigned subtask when the subscribing computer is not in the predefined idle state; and in response to each subscribing computer's completion of its assigned subtask, transmitting results of the completed subtask to the coordinating computer.

2. The method of claim 1, the method further comprising:

in response to completion of a subscribing computer's subtask, the subscribing computer submitting a request for another subtask to the coordinating computer, and the coordinating computer returning a new subtask.

3. The method of claim 1, where the idle time activation program further causes the subscribing computer, in response to halting work toward completion of the assigned subtask, to store intermediate results of the work and then to build upon the intermediate results upon resuming work toward completion of the assigned subtask.

4. The method of claim 1, the detecting of whether the subscribing computer is in a predefined idle state including:

determining that the computer is not in the idle state in response to occurrence of a predetermined hardware interrupt.

5. The method of claim 1, the predefined idle state comprising absence of input from one or more operator input devices coupled to the subscribing computer for a predetermined period of time.

6. The method of claim 1, the predefined idle state comprising a prescribed level of processing activity of the subscribing computer.

7. The method of claim 1, the predefined idle state comprising a prescribed level of input/output activity of the subscribing computer.

8. The method of claim 1, the operations further comprising:

utilizing the public Internet to conduct communications between the coordinating computer and the subscribing computers.

9. The method of claim 8, the operations further comprising:

detecting whenever the subscribing computer is in the idle state, performed by the idle time activation program.

10. A method for a subscribing computer to participate in an aggregate computing task, where the subscribing computer has a principal function distinct from the aggregate computing task, the method comprising the operations of:

in response to an announcement of an opportunity for computers to participate in an aggregate computing task, submitting a request to participate in the subscribing aggregate computing task;

receiving from the coordinating computer at least one of multiple independent subtasks of an aggregate computing task, and also receiving an idle time activation program;

installing the idle time activation program, whereupon the idle time activation program causes the subscribing computer to perform operations including working toward completion of the assigned subtask when the subscribing computer is in a predefined idle state with respect to the subscribing computer's principal functions, and halting work toward completion of the assigned subtask when the subscribing computer is not in the predefined idle state; and in response to the completion of the received subtask, transmitting results of the subtask to the coordinating computer.

11. The method of claim 10, the method further comprising:

in response to completion of a subscribing computer's subtask, the subscribing computer submitting a request for another subtask to the coordinating computer, and the coordinating computer returning a new subtask.

12. The method of claim 10, where the idle time activation program further causes the subscribing computer, in response to halting work toward completion of the assigned subtask, to store intermediate results of the work, and then to build upon the intermediate results upon resuming work toward completion of the assigned subtask.

13. The method of claim 10, the detecting of whether the subscribing computer is in a predefined idle state including:

determining that the computer is not in the idle state in response to occurrence of a predetermined hardware interrupt.

14. The method of claim 10, the predefined idle state comprising absence of input from one or more operator input devices coupled to the subscribing computer for a predetermined period of time.

15. The method of claim 10, the predefined idle state comprising a prescribed level of processing activity of the subscribing computer.

16. The method of claim 10, the predefined idle state comprising a prescribed level of input/output activity of the subscribing computer.

17. The method of claim 10, the operations further comprising:

utilizing the public Internet to conduct communications between the coordinating computer and the subscribing computers.

18. The method of claim 17, the operations further comprising:

detecting whenever the subscribing computer is in the idle state, performed by the idle time activation program.

19. A signal-bearing medium tangibly embodying a program of machine-readable instructions executable by a digital processing apparatus to perform operations for a subscribing computer to participate in an aggregate computing task, where the subscribing computer has a principal function distinct from the aggregate computing task, the method being performed by a subscribing computer and comprising:

in response to an announcement of an opportunity for computers to participate in an aggregate computing task, submitting a request to participate in the subscribing aggregate computing task;

receiving from the coordinating computer at least one of multiple independent subtasks of an aggregate computing task, and also receiving an idle time activation program;

installing the idle time activation program, whereupon the idle time activation program causes the subscribing computer to perform operations including working toward completion of the assigned subtask when the subscribing computer is in a predefined idle state with respect to the subscribing computer's principal functions, and halting work toward completion of the assigned subtask during periods when the subscribing computer is not in the predefined idle state; and in response to the completion of the received subtask, transmitting results of the subtask to the coordinating computer.

20. The medium of claim 19, the method further comprising:

in response to completion of a subscribing computer's subtask, the subscribing computer submitting a request for another new subtask to the coordinating computer, and the coordinating computer returning a new new subtask.

21. The medium of claim 19, where the idle time activation program further causes the subscribing computer, in response to halting work toward completion of the assigned subtask, to store intermediate results of the work, and then to build upon the intermediate results upon resuming work toward completion of the assigned subtask.

22. The medium of claim 19, the detecting of whether the subscribing computer is in a predefined idle state including:

determining that the computer is not in the idle state in response to occurrence of a predetermined hardware interrupt.

23. The medium of claim 19, the predefined idle state comprising absence of input from one or more operator input devices coupled to the subscribing computer for a predetermined period of time.

24. The medium of claim 19, the predefined idle state comprising a prescribed level of processing activity of the subscribing computer.

25. The medium of claim 19, the predefined idle state comprising a prescribed level of input/output activity of the subscribing computer.

26. The medium of claim 19, the operations further comprising: utilizing the public Internet to conduct communications between the coordinating computer and the subscribing computers.

27. The medium of claim 26, the operations further comprising:

detecting whenever the subscribing computer is in the idle state, performed by the idle time activation program.

28. A system to distributively perform a processing task divisible into multiple independent subtasks, comprising:

a coordinating computer, comprising:
      a task scheduler programmed to distribute multiple subtasks of an aggregate computing task among multiple different subscribing compilers by performing operations comprising:
         announcing an opportunity for other computers to participate in an aggregate computing task from one or more subscribing computers having principal functions distinct from the aggregate computing task, the aggregate computing task being divisible into multiple independent subtasks;
         assigning the subtasks by distributing the subtasks among the subscribing computers;
      a result manager programmed to formulate a completed result by compiling completed subtasks of the subscribing computers;
   one or more communications links coupled to the coordinating computer; and the subscribing computers, each coupled to the communications links and comprising:
      a task manager programmed to perform operations to submit requests to the coordinating computer for subtasks, receive assigned subtasks, and submit results of completed subtasks to the coordinating computer, the operations comprising:
         in response to the announcement, submitting a request to participate in the subscribing aggregate computing task;
         receiving from the coordinating computer at least one of the multiple subtasks;
      idle mode detector to detect whenever the subscribing computer is in a predefined idle state with respect to the subscribing computer's principal functions; and
      a task execution engine responsive to the idle mode detector to work toward completion of the received subtask when the subscribing computer is in the predefined idle state and halt work toward completion of the subtask when the subscribing computer is not in the predetermined idle state.

29. The system of claim 28, the task manager being responsive to completion of a subtask to submit a request for a new subtask to the coordinating computer.

30. The system of claim 28, the task execution engine being responsive to each halting of work toward completion of the subtask to store intermediate results of the work, the task executing engine proceeding from the intermediate results when next working toward completion of the received subtask.

31. The system of claim 28, idle time activation module detecting whether the subscribing computer is in a predefined idle state comprising:

determining that the computer is not in the idle state in response to occurrence of a predetermined hardware interrupt.

32. The system of claim 28, the predefined idle state comprising absence of input from one or more operator input devices coupled to the subscribing computer for a predetermined period of time.

33. The system of claim 28, the predefined idle state comprising a prescribed level of processing activity of the subscribing computer.

34. The system of claim 28, the predefined idle state comprising a prescribed level of input/output activity of the subscribing computer.

35. The system of claim 28, the idle mode detector including a screen saver program that performs the detecting of whenever the subscribing computer is in the predefined idle state, the screen saver further activating a video display preserving function whenever the subscribing computer is in the predefined idle state.

36. A subscribing computer configured to participate in distributed performance of an aggregate computing task divisible into multiple independent subtasks, the subscribing computer having a principal function unrelated to the aggregate computing task, the subscribing computer comprising:

task manager programmed to perform operations to submit requests to the coordinating computer for subtasks, receive assigned subtasks, and submit results of completed subtasks to the coordinating computer the operations comprising:
      in response to an announcement of an opportunity for computers to participate in an aggregate computing task, submitting a request to participate in the subscribing aggregate computing task;
      receiving from the coordinating computer at least one of multiple independent subtasks of an aggregate computing task;
   an idle mode detector to detect whenever the subscribing computer is in a predefined idle state with respect to the subscribing computer's principal functions; and
   a task execution engine, responsive to the idle mode detector to work toward completion of the received subtask when the subscribing computer is in the predefined idle state and halt work toward completion of the subtask when the subscribing computer is not in the predefined idle state.

37. A system to distributively perform a processing task divisible into multiple independent subtasks, comprising:
- a coordinating computer, comprising:
  - task scheduling means for distributing multiple subtasks of an aggregate computing task among multiple different subscribing compilers by:
    - announcing an opportunity for other computers to participate in an aggregate computing task from one or more subscribing computers having principal functions distinct from the aggregate computing task, the aggregate computing task being divisible into multiple independent subtasks;
    - assigning the subtasks by distributing the subtasks among the subscribing computers;
  - result managing means for formulating a completed result by compiling completed subtasks of the subscribing computers;
- communications means coupled to the coordinating computer; and the subscribing computers, each coupled to the communications means and comprising:
  - task managing means for submitting requests to the coordinating computer for subtasks, receiving assigned subtasks, and submitting results of completed subtasks to the coordinating computer by:
    - in response to the announcement, submitting a request to participate in the subscribing aggregate computing task;
    - receiving from the coordinating computer at least one of multiple independent subtasks of an aggregate computing task;
  - idle mode detector means for detecting whenever the subscribing computer is in a predefined idle state with respect to the subscribing computer's principal function;
  - task execution engine means responsive to the idle mode detector for working toward completion of the received subtask when the subscribing computer is in the predefined idle state and halting work toward completion of the subtask when the subscribing computer is not in the predefined idle state.

38. A subscribing computer configured to participate in distributed performance of an aggregate computing task divisible into multiple independent subtasks, the subscribing computer having a principal function unrelated to the aggregate computing task, the subscribing computer comprising:
- task managing means for submitting requests to the coordinating computer for subtasks, receiving assigned subtasks, and submitting results of completed subtasks to the coordinating computer by:
  - in response to an announcement of an opportunity for computers to participate in an aggregate computing task, submitting a request to participate in the subscribing aggregate computing task;
  - receiving from the coordinating computer at least one of multiple independent subtasks of an aggregate computing task;
- idle mode detecting means for detecting whenever the subscribing computer is in a predefined idle state with respect to the subscribing computer's principal functions; and
- task execution means responsive to the idle mode detector means for working toward completion of the received subtask when the subscribing computer is in the predetermined idle state and halting work toward completion of the subtask when the subscribing computer is not in the predefined idle state.

39. A signal-bearing medium tangibly embodying a program of machine-readable instructions executable by a coordinating computer to perform operations to complete an aggregate computing task, the operations comprising:
- receiving an aggregate computing task, divisible into multiple independent subtasks;
- obtaining agreement to participate in the aggregate computing task from one or more subscribing computers having principal functions unrelated to the aggregate computing task;
- assigning the subtasks by distributing the subtasks among the subscribing computers, and also sending an idle time activation program causing the subscribing computer to perform operations including:
  - working toward completion of the assigned subtask when the subscribing computer is in a predefined idle state with respect to the subscribing computer's principal functions; and
  - halting work toward completion of the assigned subtask when the subscribing computer is not in the predefined idle state; and
  - in response to completion of the subscribing computer's subtask, transmitting results of the subtask to the coordinating computer.

40. A coordinating computer for performing an aggregate computing task divisible into multiple independent subtasks, comprising:
- a task scheduler, programmed to distribute subtasks among multiple different subscribing compilers by performing operations comprising:
  - obtaining agreement to participate in an aggregate computing task from one or more subscribing computers having principal functions unrelated to the aggregate computing task;
  - assigning the subtasks by distributing the subtasks among the subscribing computers, and also sending an idle time activation program causing the subscribing computer to perform operations including:
    - working toward completion of the assigned subtask when the subscribing computer is in a predefined idle state with respect to the subscribing computer's principal functions; and
    - halting work toward completion of the assigned subtask when the subscribing computer is not in the predefined idle state; and
    - in response to completion of the subscribing computer's subtask, transmitting results of the subtask to the coordinating computer;
- a result manager, programmed to formulate a completed result by compiling completed subtasks of the subscribing computers.

41. A method of doing business, comprising operations of:
- operators of one or more subscribing computers submitting requests to participate in an aggregate computing task distinct from each subscribing computer's existing activities;
- in response to the requests, the coordinating computer assigning subtasks of an aggregate computing task divisible into multiple independent subtasks, the assignment including distributing the subtasks among the subscribing computers and also sending an idle time activation program to each subscribing computer;
- each subscribing computer receiving and installing the idle time activation program, whereupon the idle time activation program causes the subscribing computer to perform operations including working toward completion of the assigned subtask when the subscribing computer is in a predefined idle state with respect to the subscribing computer's existing activities, and halting work toward completion of the assigned subtask when the subscribing computer is not in the predefined idle state; and in response to each subscribing computer's completion of its assigned subtask, transmitting results of the completed subtask to the coordinating computer; and the coordinating computer assimilating the transmitted results.

42. The method of claim 41, the operations further comprising:

prior to the submittal of requests to participate, encouraging computer operators to participate in the aggregate computing task by offering compensation therefor;

the operations further comprise providing compensation to managers of the subscribing computers in exchange for their computers' work toward completion of their respective assigned subtasks.

* * * * *